(12) United States Patent
Eisermann et al.

(10) Patent No.: US 9,755,211 B2
(45) Date of Patent: Sep. 5, 2017

(54) ACCUMULATOR ARRANGEMENT, BUSBAR ELEMENT THEREFOR AND METHOD FOR PRODUCING AN ACCUMULATOR ARRANGEMENT

(71) Applicant: Johnson Controls Advanced Power Solutions GmbH, Hannover (DE)

(72) Inventors: Henning Eisermann, Edemissen (DE);
Kristina Brettschneider, Goslar (DE);
Helge Brenner, Hannover (DE);
Markus Hoh, Garbsen (DE); Martin Wiegmann, Borstel (DE); Marco Jansen, Groβ Hehlen (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/398,952

(22) PCT Filed: Jun. 5, 2013

(86) PCT No.: PCT/EP2013/061567
§ 371 (c)(1),
(2) Date: Dec. 5, 2014

(87) PCT Pub. No.: WO2013/182589
PCT Pub. Date: Dec. 12, 2013

(65) Prior Publication Data
US 2015/0125739 A1    May 7, 2015

Related U.S. Application Data

(60) Provisional application No. 61/656,388, filed on Jun. 6, 2012.

(51) Int. Cl.
*H01M 2/02* (2006.01)
*H01M 2/20* (2006.01)
(Continued)

(52) U.S. Cl.
CPC ......... *H01M 2/206* (2013.01); *H01M 2/1077* (2013.01); *H01M 2/1094* (2013.01);
(Continued)

(58) Field of Classification Search
CPC ........... B60L 11/1879; H01M 2220/20; H01M 2/1077; H01M 2/1094; H01M 2/206;
(Continued)

(56) References Cited

U.S. PATENT DOCUMENTS

| 9,300,061 B2 | 3/2016 | Kinoshita et al. |
| 2001/0039150 A1 | 11/2001 | Saito et al. |

(Continued)

FOREIGN PATENT DOCUMENTS

| CN | 1881654 | 12/2006 |
| CN | 101142699 | 3/2008 |

(Continued)

OTHER PUBLICATIONS

International Search Report & Written Opinion for International Application Na PCT/EP2013/061567 mailed Dec. 9, 2013.

(Continued)

*Primary Examiner* — Patrick Ryan
*Assistant Examiner* — Ben Lewis
(74) *Attorney, Agent, or Firm* — Fletcher Yoder, P.C.

(57) ABSTRACT

The invention relates to an accumulator arrangement which has a plurality of series-connected individual accumulators, each individual accumulator having at least one plus pole and a minus pole as externally accessible connection poles, busbar elements being secured on the connection poles in order to form the series connection, which each connect a minus pole of an individual accumulator to a plus pole of another individual accumulator, characterized in that a specific assembly sequence of said busbar elements is determined by the structural design of the busbar elements. The (Continued)

invention further relates to a busbar element and a to method for producing an accumulator arrangement.

14 Claims, 4 Drawing Sheets

(51) Int. Cl.
*H01M 2/10* (2006.01)
*H01M 2/34* (2006.01)
*B60L 11/18* (2006.01)
*H01R 11/28* (2006.01)

(52) U.S. Cl.
CPC ............ *H01M 2/34* (2013.01); *B60L 11/1879* (2013.01); *H01M 2220/20* (2013.01); *H01R 11/288* (2013.01); *Y02T 10/705* (2013.01); *Y10T 29/49108* (2015.01)

(58) Field of Classification Search
CPC .... H01M 2/34; H01R 11/288; Y02T 10/7005; Y02T 10/705; Y10T 29/49108
See application file for complete search history.

(56) References Cited

U.S. PATENT DOCUMENTS

| | | | |
|---|---|---|---|
| 2006/0251960 | A1 | 11/2006 | Yoon et al. |
| 2008/0160395 | A1 | 7/2008 | Okada et al. |
| 2009/0208836 | A1* | 8/2009 | Fuhr ................... H01M 2/024 429/158 |

FOREIGN PATENT DOCUMENTS

| | | |
|---|---|---|
| CN | 102013509 | 4/2011 |
| EP | 2172994 | 4/2010 |
| JP | 2008181934 | 8/2008 |
| WO | 2006112628 | 10/2006 |
| WO | 2008/021230 | 2/2008 |

OTHER PUBLICATIONS

CN Office Action dated Dec. 31, 2015.
EP 13728361.0 Article 94(3) dated May 12, 2017.

\* cited by examiner

ACCUMULATOR ARRANGEMENT, BUSBAR ELEMENT THEREFOR AND METHOD FOR PRODUCING AN ACCUMULATOR ARRANGEMENT

The invention relates to an accumulator arrangement in accordance with the preamble of claim 1. The invention further relates to a busbar element according to claim 11 as well as a method for producing an accumulator arrangement according to claim 12.

In general terms, the invention relates to the field of accumulator arrangements having a plurality of individual accumulators connected in series. Such accumulator arrangements are in particular used in the field of electric vehicles and hybrid vehicles, whereby to some extent there can be considerable voltage into the range of several thousand volts at the external electrical connections of the accumulator arrangement. Such accumulator arrangements are thereby assembled from individual accumulators of lower voltages which are usually in the low-voltage range which poses no danger to humans. The voltage range of 0-60 volts is identified as being the low-voltage range. However, higher voltages which do pose danger to humans occur during the connecting of the individual accumulators into the series connection of the aggregate accumulator arrangement. Even just the connecting of two, three or more individual accumulators when assembling the accumulator arrangement increases voltages above the non-hazardous range for humans such that special safety precautions are necessary.

A comparable problem arises in the repair and maintenance of such accumulator arrangements, e.g. when an individual accumulator needs to be replaced. Here, too, maintenance persons can then encounter high voltages such that other special safety precautions are in turn necessary.

The invention is based on the objective of specifying an accumulator arrangement of the type described above which increases safety with respect to high voltage accidents. An appropriately suitable busbar element for such an accumulator arrangement and a method for producing a safer accumulator arrangement is also to be further specified.

In accordance with claim 1, this objective is accomplished by an accumulator arrange-ment having a plurality of individual accumulators connected in series, wherein each individual accumulator has at least one positive terminal and one negative terminal as externally accessible terminal posts, wherein to form the series connection, busbar elements are fixed to the terminal posts, each respectively connecting a negative terminal of one individual accumulator to a positive terminal of another individual accumulator, whereby the structural design of the busbar elements dictates a specific assembly sequence of said busbar elements. The invention has the advantage of the increased safety vis-à-vis high voltage accidents already being taken into account constructively in the busbar elements as a result of their configuration, compelling a specific assembly sequence able to assure safety. A technician assembling the accumulator arrangement is forced to follow a specific procedure or else be prevented from assembling the accumulator arrangement by the very structural design of the busbar elements itself. The busbar elements have to be fit one by one from one individual accumulator to the next. The structural design of the busbar element thereby ensures that there can never be any contact with the live parts of two or more individual accumulators already connected in series, particularly the terminal posts. Contact is only possible in the case of individual accumulator terminal posts which are not yet in the series connection as such contact is not dangerous. The invention thereby allows a modular and at the same time safe assembling of the busbar arrangement as a whole.

The structural design of the busbar element likewise dictates a safe procedure for accumulator arrangement maintenance or repair. The busbar elements must be removed in sequence. Here, too, there can never be any contact with the live parts of two or more series-connected individual accumulators.

A further advantage of the invention consists of the busbar element at the same time also preventing unintentional short circuits during the assembly or dismantling of the accumulator arrangement.

A further advantage of the invention consists of being able to dispense with a breaker or a disconnection plug as required in the prior art solutions to disconnect the high-voltage circuit during servicing. This in turn has the advantage of saving the associated additional costs and being able to dispense with components which can potentially cause additional malfunctions. Moreover, the flow of electrical current is not subject to interference by additional components such as the cited breaker or disconnection plug.

According to one advantageous further development of the invention, a busbar element at least partially covers an adjacent busbar element. Doing so simply and economically provides a structural design to the busbar elements which dictates a specific assembly sequence for said busbar elements. The overlapping coverage results in not being able to mount the covered adjacent busbar element subsequent to the covering busbar element but rather only in the reverse order. The same applies to dismantling in which the overlapping coverage likewise dictates a specific succession of busbar elements.

According to one advantageous further development of the invention, a busbar element comprises at least one electrically conductive connector element connected electrically (and mechanically) to the two respective terminal posts and an insulating cap made of insulating material fixed to the connector element. Doing so provides further readily realizable, economical design options for the busbar elements, by means of which the structural design of the busbar elements can dictate a specific assembly sequence for said busbar elements.

According to one advantageous further development of the invention, the insulating cap projects beyond the connector element in the direction of at least one adjacent busbar element, with its projecting region at least partly covering the adjacent busbar element. This has the advantage of the insulating cap of a busbar element not only being able to protect the electrically conductive connector element of its own busbar element but also protect an adjacent busbar element by means of its projecting region. The protection ensues from the projecting region at least partly covering the adjacent busbar element. Doing so thus constructionally stipulates a specific sequence to the assembly of indivi-dual accumulators and busbar elements. The structural design of the busbar element with the insulating cap thereby ensures that there can never be any contact with the live parts of two or more individual accumulators already connected in series, particularly the terminal posts.

According to one advantageous further development of the invention, the insulating cap of the busbar element covers its connector element at least when fixed to the terminal posts. The insulating cap does not thereby have to fully cover the connector element, in fact depending on the design of the individual accumulator housing, covering two of the six given edges will in many cases suffice. Because a plurality of busbar elements with insulating caps are arranged in a row, as it were, complete coverage of the connector elements disposed underneath results.

According to one advantageous further development of the invention, the insulating cap of the busbar element has at least one opening which allows access to the connector element of the busbar element or a terminal post fixing means for fixing the connector element to a terminal post through the insulting cap. This has the advantage of the busbar element being able to be fixed to the individual accumulators as a pre-assembled unit of connector element and insulating cap fixed thereon. Doing so further increases safety and further reduces the risk of high-voltage accidents. Doing so particularly also prevents incorrect application of the busbar element since it is already one unit of connector element and insulating cap and mounted as one unit. Because of the at least one opening, usually two openings respectively, a tool can be used to electrically and mechanically fix the busbar element, after it has first been brought into position, to the terminal posts via terminal post fixing means through the insulating cap. Screws are for example used as terminal post fixing means, wherein one screw is screwed in at each terminal post and the connector element thereby pressed to the terminal post. Other terminal post fixing means can however also be used such as, for example, claw fastenings terminal clips or terminal clamps.

According to one advantageous further development of the invention, the at least one opening in the insulating cap is not arranged in the insulating cap's projecting region. The opening is instead arranged in the region where the connector element is disposed underneath the insulating cap.

According to one advantageous further development of the invention, the projecting region of the insulating cap covers the at least one opening of an adjacent busbar element's insulating cap. This has the advantage of in turn covering the next opening or openings necessary for safely attaching a busbar element via its insulating cap after the next busbar element has been attached and thus protecting against accidental contact.

According to one advantageous further development of the invention, the connector element is fixed to the insulating cap by a hinge connection, a snap connection or other detachable or non-detachable connecting means. The fixing is particularly to be designed such that it cannot disengage unintentionally during assembly of the accumulator arrangement. Intentional disengaging of the fixing is also to be prevented to the greatest extent possible. This has the advantage of the busbar element necessarily having to be provided as a complete finished unit of connector element and associated insulating cap for the final assembly of the accumulator arrangement, one which also cannot be readily separated.

According to one advantageous further development of the invention, the insulating cap comprises at least one additional fixing means for fixing the busbar element to an adjacent busbar element. The insulating cap can thereby be mechanically coupled to the adjacent busbar element, which results in additional stabilizing of the entire arrangement of multiple series-connected busbar elements as a whole. Appropriately designing the additional fixing means can also further limit the sequence of operations as desired when assembling the accumulator arrangement, resulting in a safe sequence of operations. The additional fixing means can for example be a snap or clip fastener, by means of which the insulating cap of one busbar element is coupled to the adjacent busbar element. The insulating cap of a busbar element can thereby be coupled to the insulating cap or the connector element or to both elements of the adjacent busbar element. According to one advantageous further development of the invention, the busbar element comprises receiving means for the additional fixing means of an adjacent busbar element, wherein the receiving means is designed as the counterpart to the additional fixing means and serves to receive the additional fixing means. Thus, the additional fixing means together with the receiving means can for example form a type of joint or hinge such that after the additional fixing means and the receiving means of the adjacent busbar element are coupled together, a pivoting motion is required to position the next busbar element to be attached into its ultimate mounting position in which only then can it be affixed to the terminal posts.

According to one advantageous further development of the invention, the additional fixing means is arranged on the projecting region of the insulating cap. According to one advantageous further development of the invention, the receiving means for the additional fixing means is arranged in the area of the projecting region of the insulating cap, particularly on the end of the projecting region facing the connector element.

According to one advantageous further development of the invention, the busbar element comprises at least one receiving chamber for receiving a terminal post fixing means for fixing the connector element to a terminal post. This has the advantage of being able to keep the terminal post fixing means at a defined position, namely the receiving chamber, and also being able to be provided together with the pre-assembled busbar element. The receiving chamber can be for example formed in the insulating cap and/or the connector element. Thus, the receiving chamber can for example be partly covered by the connector element such that the terminal post fixing means can no longer fall out of the receiving chamber during assembly due to the connector element retention. This aids in the quick and easy assembly of the accumulator arrangement. It is advantageous for the busbar element to be configured with at least two receiving chambers to each receive a respective terminal post fixing means.

According to one advantageous further development of the invention, the accumulator arrangement comprises at least one external electrical connection furnished to provide the accumulator energy to an energy load, wherein the external connection is connectable to an energy load via an external connector element and wherein the external connector element comprises at least one electrically conductive contact element which is electrically (and mechanically) connected to a terminal post of an individual accumulator and an insulating cap made of insulating material fixed to the contact element, whereby the insulating cap projects beyond the contact element in the direction of at least one adjacent busbar element and the projecting region at least partly covers said adjacent busbar element. This has the advantage of the inventive principle of modular busbar design also extending to the external connector elements so that they are also incorporated into the safety concept.

According to one advantageous further development of the external connector element, it is provided for
  the insulating cap of the external connector element to have at least one opening allowing access to the contact element of the external connector element or to a terminal post fixing means for fixing the contact element to a terminal post through the insulating cap,
  the projecting region of the insulating cap of the external connector element to cover at least one opening of the insulating cap of an adjacent busbar element, the contact element to be fixed to the insulating cap of the external connector element by a hinge connection, a snap connection or other detachable or non-detachable connecting means, the insulating cap of the external connector element to comprise at least one additional fixing means for fixing the external connector element to an adjacent busbar element, the insulating cap of the external connector element to comprise at least one receiving chamber for receiving a terminal post fixing means for fixing the contact element to a terminal post.

By so doing, the external connector element can also realize the advantages cited above with respect to the busbar element.

The objective citied at the outset is accomplished in accordance with claim 11 by a busbar element for an accumulator arrangement of the type described above, wherein the busbar element comprises at least one electrically conductive connector element to be respectively electrically connected to two terminals of individual accumulators and an insulating cap made from an insulating material fixed to the connector element by connecting means, wherein the insulating cap projects beyond the connector element such that the projecting region at least partly covers an adjacent busbar element of the series-connected individual accumulators. The busbar element can particularly be further configured in accordance with the above-described advantageous further developments of the invention.

The objective cited at the outset is additionally accomplished pursuant to claim 12 by a method for producing an accumulator arrangement according to any one of claims 1 to 10 comprising the following steps:

a) providing the individual accumulators which are to be connected together in series, b) affixing an electrical connection line or other electrical connection module to a terminal post of the first individual accumulator of the series connection, c) affixing a busbar element to the other terminal post of the first individual accumu-lator and a terminal post of the next individual accumulator in the series connection, d) affixing a busbar element to the other terminal post of the previous individual accumulator and a terminal post of the next individual accumulator in the series connection, e) repeating step d) until the last individual accumulator in the series connection is connected to the second-last individual accumulator by a busbar element, f) affixing an electrical connection line or other electrical connection module to the remaining terminal post of the last individual accumulator.

The method permits safely producing an accumulator arrangement, whereby persons involved in the production are protected against high-voltage accidents and the risk of short circuits during production is additionally prevented. Each time a busbar element is affixed, the series connection of individual accumulators already formed to that point is at the same time insulated against the outer environment.

When the accumulator arrangement requires service or maintenance, it can be dismantled by performing the steps of claim 12 in the reverse order so that one or more individual accumulators can be replaced.

One advantageous further development of the invention provides for affixing the busbar element in step c) and/or d) as follows:

i) mechanically coupling an insulating cap of the busbar element to an adjacent busbar element by means of at least one additional fixing means provided on the insulating cap of the busbar element, ii) affixing the connector element to the terminal posts with terminal post fixing means manipulated through openings of the insulating cap by a tool.

According to one advantageous further development of the invention, a pivoting motion occurs after step i) and prior to step ii) to bring the busbar element into an assembly position before step ii) can even be performed.

Doing so further supports the safe assembly and dismantling of the accumulator arrangement.

Reference will be made below to the figures in using embodiments to describe the invention in greater detail.

Shown are.

The figures use the same reference numerals for like elements.

Figure 1:
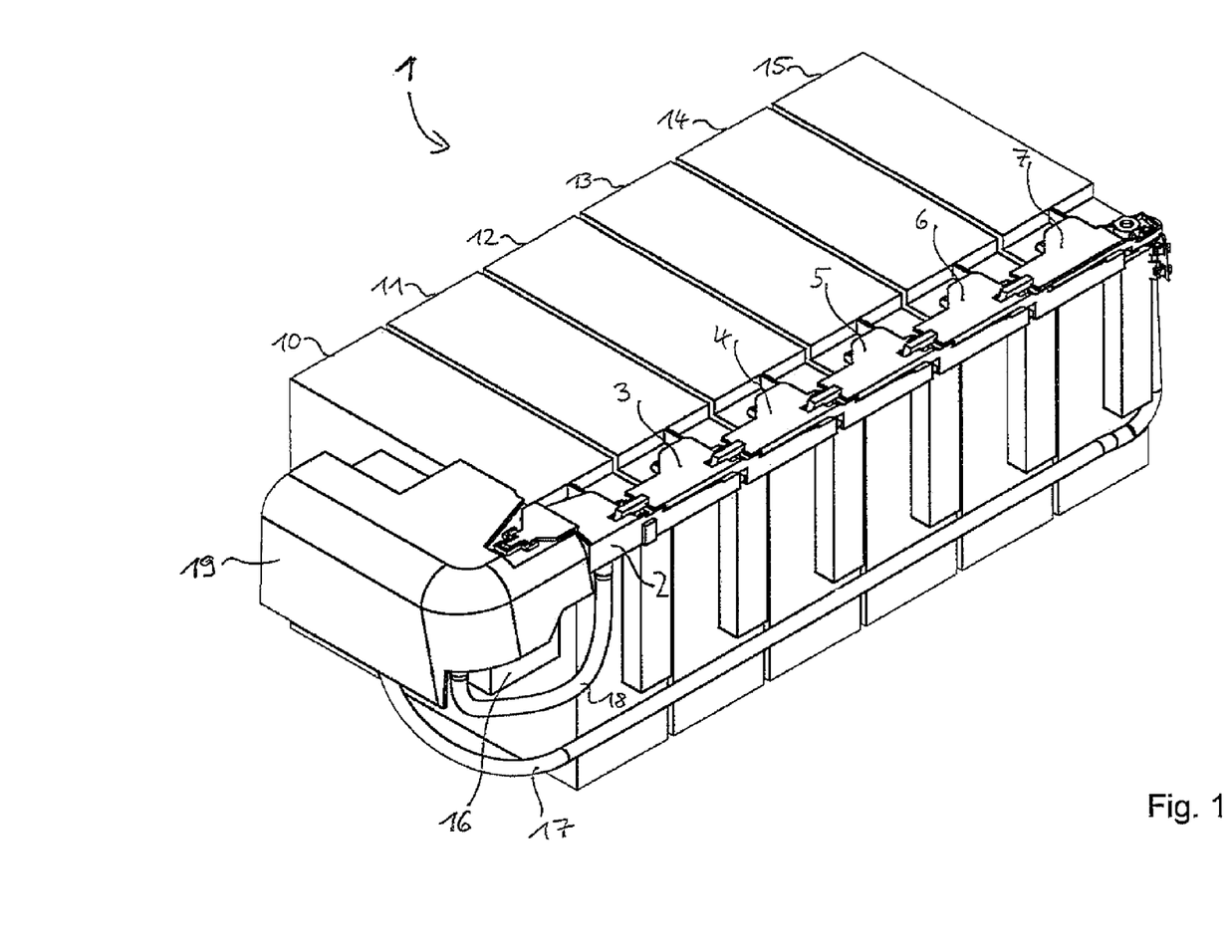
FIG. 1 a completed accumulator arrangement.

FIG. 1 shows an accumulator arrangement 1 having six individual accumulators 10, 11, 12, 13, 14, 15 connected in series. The individual accumulators can for example have, as is recognizable in FIG. 1, a prismatic, particularly rectangular external shape. The individual accumulators 10, 11, 12, 13, 14, 15 in each case have two externally accessible terminal posts, namely a positive terminal and a negative terminal. Each individual accumulator can be formed per se of a plurality of individual accumulator cells, e.g. round cells or the like. To connect such individual accumulators into an electrically conductive series connection, it is known to provide a so-called busbar assembly (or also just "bus bar") with which two individual accumulators are respectively connected by one busbar unit. The busbar unit as a whole is then designated the busbar assembly.

According to the present invention, the busbar assembly is configured as a module of multiple busbar elements; busbar elements 2, 3, 4, 5, 6 in the embodiment as depicted. Due to their structural design, they dictate a specific assembly sequence to the busbar elements during the assembly of the accumulator arrangement, as will be described in greater detail below.

External connector elements, here in the form of external connector element 7, are arranged on the respective end terminal posts of the accumulator arrangement 1, at one end on individual accumulator 10 and at the other end on individual accumulator 15. The respective external connector element of accumulator arrangement 10 is not visible in FIG. 1 because it is covered by other components.

The external connector elements connect the series-connected individual accumulators to an electrical module 16 via electrical cables 17, 18. An end cover 19 caps the electrical module 16 in insulating manner for insulating and safety purposes. The electrical module 16 comprises e.g. a relay or a contactor respectively, also electronic components as applicable, which form a control circuit for controlling the relay and/or contactor and/or to charge the accumulator arrangement 1. The electrical module 16 comprises e.g. a plug connection to plug into a vehicle plug for the electrical contacting of the accumulator arrangement 1 when used in a vehicle.

Figure 2:
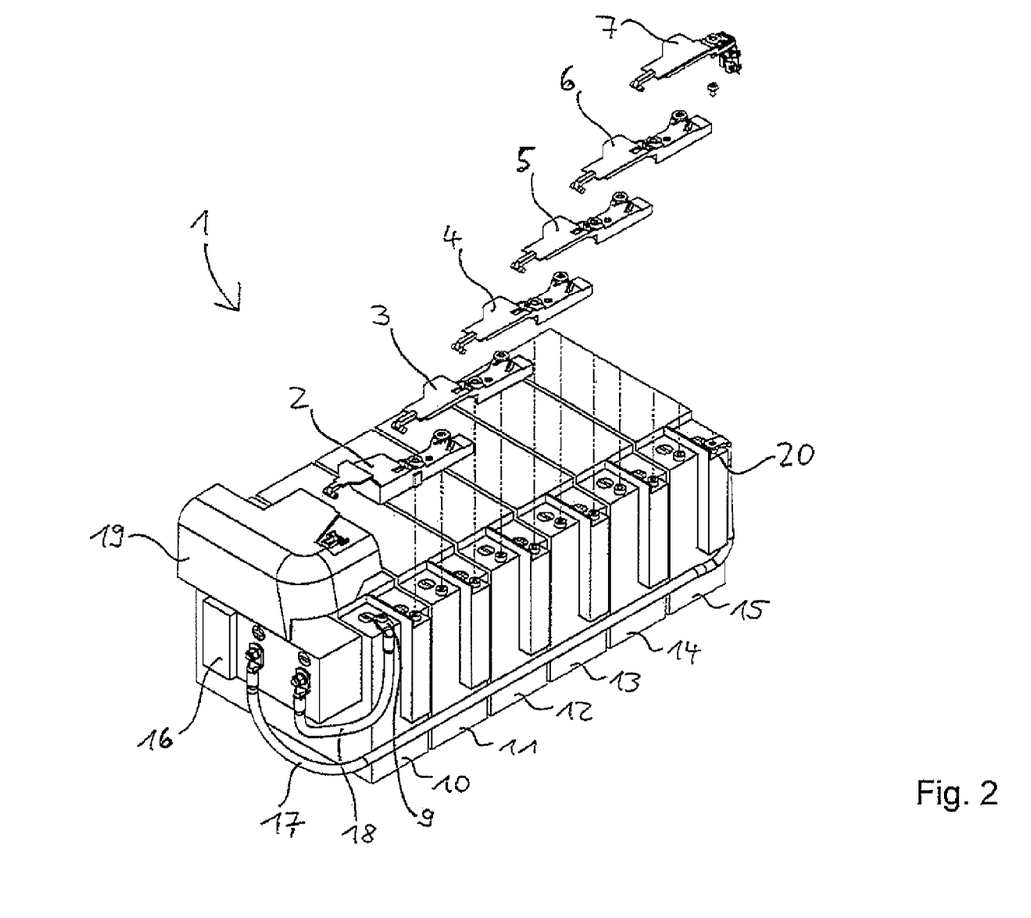
FIG. 2 a quasi exploded view of the assembly of the accumulator arrangement, FIG. 3 example steps in the assembling of the accumulator arrangement according to FIG. 1, and FIGS. 4-6 steps involved in the providing of a busbar element.

FIG. 2 shows the accumulator arrangement 1 according to FIG. 1, whereby similar to an exploded view, the end cover 19, the busbar elements 2, 3, 4, 5, 6 and the external connector element 7 of the individual accumulators are depicted in suspension. The sequence in which the components 19, 2, 3, 4, 5, 6, 7 are depicted above each other at the same time also represents the assembly sequence dictated by the structural design of these components. The higher-depicted components are fit subsequent to the lower-depicted components.

The other electrical external connector element in the form of external connector element 9 can also be seen in FIG. 2 on the first individual accumulator 10.

Figure 3:
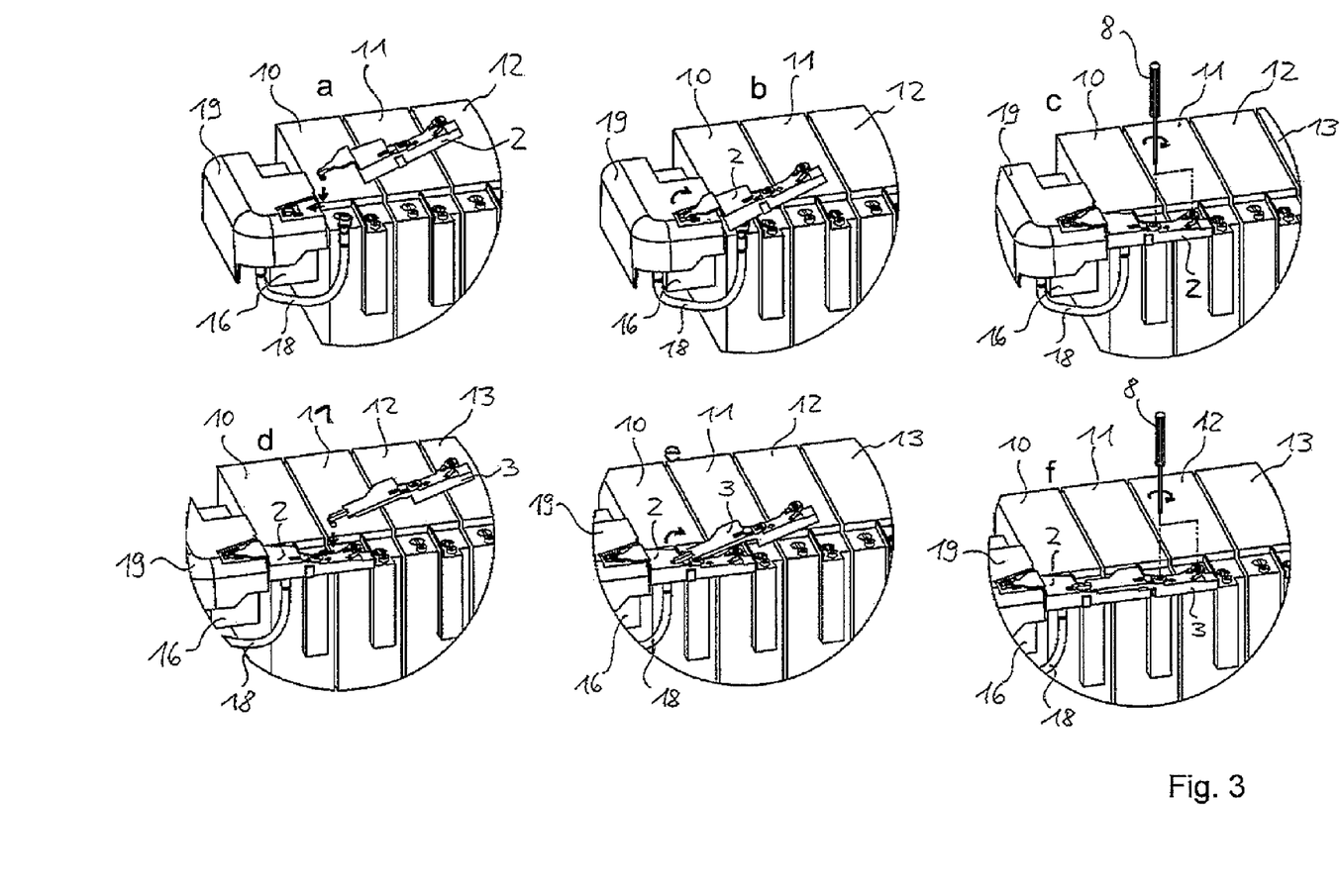

Reference will be made to FIG. 3 in describing by way of example the assembly of the accumulator arrangement 1 and particularly the assembly sequence of the busbar elements dictated by the structural design. Assembly occurs in the order of component figures a, b, c, d, e and lastly f, same concurrently depicting the assembly steps.

In assembly step a), it may first be assumed that the end cover 19 has already been affixed. The first busbar element 2 is then mounted. The element is then, as can be seen in assembly step a), guided by an additional fixing means in the form of a protruding fixing lug to a respective receiving means for the fixing lug provided on the end cover 19. In step b), the fixing lug is introduced into the receiving means and the busbar element 2 moved downward by a pivoting motion to the terminal posts of the individual accumulators 10, 11 to be electrically connected by the busbar element 2. The busbar element 2 is then in the position depicted in assembly step c). In this position, a tool 8 can affix terminal post fixing means, e.g. screws, to the terminal posts. In a subsequent assembly step d), the next busbar element 3 is affixed to the first busbar element 2 in the same manner as the busbar element 2 was affixed to the end cover 19. A fixing lug of the busbar element 3 is introduced into the receiving means of the busbar element 2. In turn following in assembly step e) is the pivoting motion into the assembly position depicted in assembly step f). Lastly, a tool 8 again fixes the busbar element 3 via the terminal post fixing means to the terminal posts of the individual accumulators 11, 12 to thereby be connected. The further busbar elements 4, 5, 6 as well as the external connector element 7 are affixed in the same way.

Figure 4:
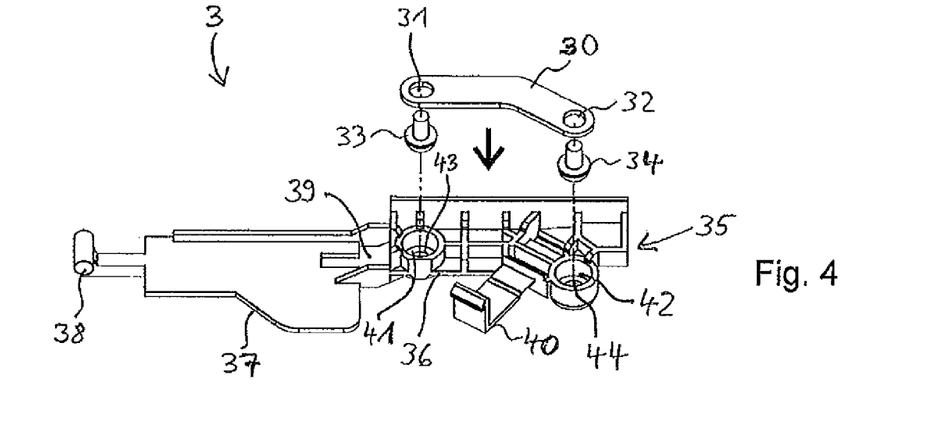
Figure 5:
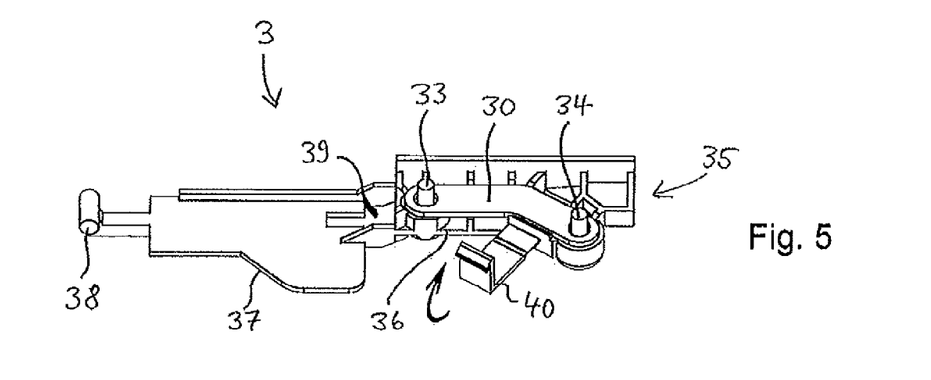
Figure 6:
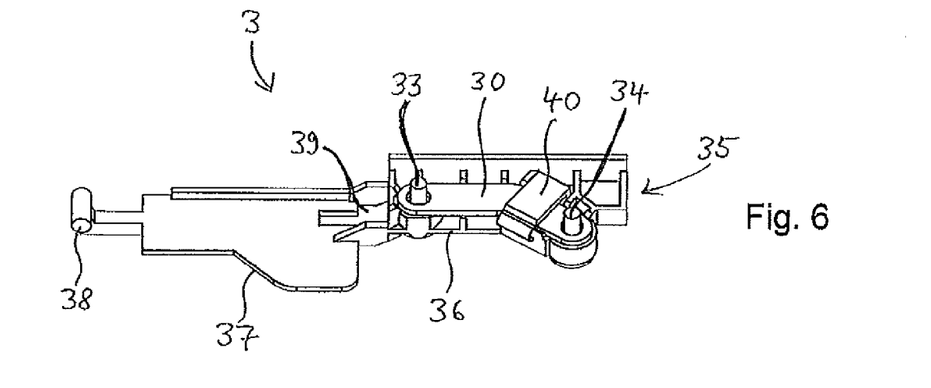

Reference will be made to FIGS. 4 to 6 in describing the configuration of the busbar elements 2, 3, 4, 5, 6 by way of example. In principle, the external connector element 7 is configured in the same way, except that instead of one busbar element connecting two external connections, only one contact element is provided for the connection to a terminal post of an individual accumulator.

FIGS. 4 to 6 show the busbar element 3 in a view which is essentially the reverse of the views in FIGS. 1 to 3, of the underside as it were, where the electrically conductive connector element can be seen, looking toward the busbar element 3.

As can be noted in FIG. 4, the busbar element 3 comprises an insulating cap 35, an electrically conductive connector element 30 as well as two terminal post fixing means in the form of screws 33, 34 as separate components. The connector element 30 is designed for example in the form of a metal strip in which openings 31, 32 through which to run the screws 33, 34 are provided in the end regions at which a connection to terminal posts of the individual accumulators is to occur. The insulating cap 35 is made from an electrically insulating material, for example a plastic such as e.g. polypropylene.

It can be seen that the insulating cap 35 has an unusual shape and is in particular considerably longer than connector element 30, particularly due to a region 37 projecting beyond the connector element 30. A connector receiving area 36 of the insulating cap 35 serves to receive connector element 30. The connector receiving area 36 has two receiving chambers 41, 42 provided to receive, at least partially receive, the terminal post fixing means. The terminal post fixing means 33, 34 can be inserted into the respective receiving chamber 41, 42 by their screw heads. The connector element 30 can thereafter be positioned on top. The assembly as depicted in FIG. 5 then results. As can be seen, the insulating cap 35 encloses the connector element 30 on at least two sides at least in connector receiving area 36 which largely results in an encapsulation of the connector elements 30 by the insulating cap 35 and the housing exteriors of the individual accumulators after fixing to the individual accumulators.

A retaining clip 40 can be integrally formed on the connector receiving area 36 of the insulating cap 35, e.g. in a plastic injection molding process. The retaining clip 40 can be pivoted about the connector element 30 as depicted by the FIG. 5 arrow and then, as can be seen in FIG. 6, latched again to a corresponding section of the insulating cap 35. Doing so fixes the connector element 30 to the insulating cap 35 in captive and not readily removable manner. The connector element 30 is horizontally fixed by the positioned terminal post fixing means 33, 34 among other things. The terminal post fixing means 33, 34 are for their part in turn held captively in their receiving chambers 41, 42 by the connector element 30.

In the assembly steps of the busbar elements 2, 3, 4, 5, 6 and the external connector element 7 described above with respect to FIG. 3, said elements are already correspondingly provided pre-assembled with the connector element 30 or a corresponding external connector element and terminal post fixing means 33, 34 respectively, and are then inserted as such in the final assembly of the accumulator arrangement. To this end, the insulating cap 35 has a respective opening 43, 44 in the region of the respective receiving chamber 41, 42 through which the tool 8 can screw the respective terminal post fixing means 33, 34 to a terminal post.

The insulating cap 35 further comprises the above-cited projecting region 37. Same can be integrally formed on the connector receiving area 36 or can also be configured as a separate component. The projecting region is formed in such a manner so as to at least partly cover an adjacent busbar element. The projecting region thereby advantageously covers the connector receiving area 36 of an adjacent busbar element, its insulating cap respectively, whereby the projecting region 36 covers at least the openings 43, 44 provided to screw the terminal post fixing means 33, 34 into the receiving chambers 41, 42 from the outside, at least to the extent that no accidental contact with the live terminal post fixing means can occur.

An additional fixing means 38 can which can be integrally formed on the projecting region 37 or can also be affixed as a separate component is further provided on the projecting region 37. The additional fixing means 38 forms the above-cited fixing lug which can be introduced into an adjacent busbar element and which makes the pivotal motion depicted in FIGS. 3b and 3e necessary. For this purpose, the additional fixing means 38 is inserted into a receiving area 39 of an adjacent busbar element, its insulating cap 35 respectively. The additional fixing means 38 then forms a type of joint and/or hinge structure with the receiving area 39 which allows the cited pivoting motion.

The invention claimed is:

1. An accumulator arrangement comprising a plurality of individual accumulators connected in series, wherein each individual accumulator of the plurality of individual accumulators has at least one positive terminal and at least one negative terminal, wherein the at least one positive terminal and the at least one negative terminal are externally accessible terminal posts extending outwardly from a surface of each individual accumulator of the plurality of individual accumulators, wherein a plurality of busbar elements are fixed to the terminal posts to form the series connection, wherein a first busbar element of the plurality of busbar elements connects a negative terminal of a first individual accumulator of the plurality of individual accumulators to a positive terminal of a second individual accumulator of the plurality of accumulators, and wherein the structural design of the plurality of busbar elements is such that the busbar elements of the plurality of busbar elements at least partially overlap with one another to dictate a specific assembly sequence of the plurality of busbar elements.

2. The accumulator arrangement of claim 1, wherein the first busbar element of the plurality of busbar elements at least partially covers an adjacent busbar element of the plurality of busbar elements.

3. The accumulator arrangement of claim 1, wherein the first busbar element of the plurality of busbar elements comprises at least one electrically conductive connector element electrically connected to the negative terminal of the first individual accumulator of the plurality of individual accumulators and the positive terminal of the second individual accumulator of the plurality of individual accumulators and an insulating cap made of insulating material fixed to the connector element.

4. The accumulator arrangement of claim 3, wherein the insulating cap comprises a projecting region, and wherein the projecting region extends beyond the connector element toward an adjacent busbar element of the plurality of busbar elements and at least partially covers the adjacent busbar element.

5. The accumulator arrangement of claim 4, wherein the insulating cap of the first busbar element comprises at least one opening allowing access to the connector element of the first busbar element or a terminal post fixing means for fixing the connector element to a terminal post through the insulating cap.

6. The accumulator arrangement of claim 5, wherein the projecting region of the insulating cap covers an opening of the insulating cap of the adjacent busbar element.

7. The accumulator arrangement of claim 3, wherein the connector element is fixed to the insulating cap by a hinge connection, a snap connection or other detachable or non-detachable connecting means.

8. The accumulator arrangement of claim 3, wherein the insulating cap comprises at least one additional fixing means for fixing the first busbar element to an adjacent busbar element of the plurality of busbar elements.

9. The accumulator arrangement of claim 3, wherein the first busbar element comprises at least one receiving chamber for receiving a terminal post fixing means for fixing the connector element to a terminal post.

10. The accumulator arrangement of claim 1, comprising at least one external electrical connection configured to provide accumulator energy to an energy load, wherein the at least one external connection is configured to connect to the energy load via an external connector element, and wherein the external connector element at least partially covers an adjacent busbar element of the plurality of busbar elements.

11. The accumulator arrangement of claim 1, comprising a second busbar element having at least one electrically conductive connector element configured to be electrically connected to respective positive and negative terminals of a third individual accumulator of the plurality of individual accumulators and a fourth individual accumulator of the plurality of individual accumulators and an insulating cap made from an insulating material fixed to the connector element by connecting means, and wherein the insulating cap comprises a projecting region configured to extend beyond the connector element such that the projecting region at least partially covers an adjacent busbar element of the plurality of busbar elements.

12. A method for producing the accumulator arrangement of claim 1, comprising the following steps:
   a) providing the plurality of individual accumulators which are to be connected together in series, wherein each individual accumulator of the plurality of accumulators has at least one positive terminal and at least one negative terminal, wherein the at least one positive terminal and the at least one negative terminal are externally accessible terminal posts extending outwardly from a surface of each individual accumulator of the plurality of individual accumulators,
   b) affixing an electrical connection line or an electrical connection module to a first terminal post of the first individual accumulator of the plurality of individual accumulators which are to be connected together in series,
   c) affixing the first busbar element of the plurality of busbar elements to a second terminal post of the first individual accumulator and to a third terminal post of the second individual accumulator of the plurality of individual accumulators in the series connection,
   d) affixing a second busbar element of the plurality of busbar elements to a fourth terminal post of the second individual accumulator and a fifth terminal post of a third individual accumulator of the plurality of individual accumulators in the series connection, such that the first busbar element is at least partially covered by the second busbar element,
   e) repeating step d) until a final individual accumulator of the plurality of individual accumulators in the series connection is connected to a second-to-last individual accumulator of the plurality of individual accumulators by a third busbar element of the plurality of busbar elements,
   f) affixing an additional electrical connection line or an additional electrical connection module to a sixth terminal post of the final individual accumulator.

13. The method of claim 12, wherein the first busbar element or the second busbar element is affixed in step c) and/or d) as follows:
   i) mechanically coupling an insulating cap of the first busbar element or the second busbar element to an adjacent busbar element of the plurality of busbar elements by means of at least one additional fixing means provided on the insulating cap of the first busbar element or the second busbar element, and
   ii) affixing a connector element of the first busbar element or the second busbar element to the terminal posts with terminal post fixing means manipulated through openings of the insulating cap by a tool.

14. A method, comprising:
a) providing a plurality of individual accumulators which are to be connected together in series,
b) affixing an electrical connection line or an electrical connection module to a first terminal post of a first individual accumulator of the plurality of individual accumulators which are to be connected together in series,
c) affixing a first busbar element of a plurality of busbar elements to a second terminal post of the first individual accumulator and to a third terminal post of a second individual accumulator of the plurality of individual accumulators in the series connection,
d) affixing a second busbar element of the plurality of busbar elements to a fourth terminal post of the second individual accumulator and a fifth terminal post of a third individual accumulator of the plurality of individual accumulators in the series connection, such that the first busbar element is at least partially covered by the second busbar element,
e) repeating step d) until a final individual accumulator of the plurality of individual accumulators in the series connection is connected to a second-to-last individual accumulator of the plurality of individual accumulators by a third busbar element of the plurality of busbar elements, and
f) affixing an additional electrical connection line or an additional electrical connection module to a sixth terminal post of the final individual accumulator,
wherein the first busbar element or the second busbar element is affixed in step c) and/or d) as follows:
i) mechanically coupling an insulating cap of the first busbar element or the second busbar element to an adjacent busbar element of the plurality of busbar elements by means of at least one additional fixing means provided on the insulating cap of the first busbar element or the second busbar element, and
ii) affixing a connector element of the first busbar element or the second busbar element to the terminal posts with terminal post fixing means manipulated through openings of the insulating cap by a tool, and
wherein a pivoting motion occurs after step i) and prior to step ii) to bring the first busbar element or the second busbar element into an assembly position before step ii) can even be performed.

* * * * *